United States Patent [19]

Evans et al.

[11] Patent Number: 5,505,003
[45] Date of Patent: Apr. 9, 1996

[54] GENERATIVE MEASURING SYSTEM

[75] Inventors: Michael Evans, Germantown; A. Michael Lombardo, Bellbrook; Michael A. Parker, Franklin; Steven Ullery, West Carrollton; Charles W. Denison, Jr., Germantown, all of Ohio

[73] Assignee: M&M Precision Systems Corporation, West Carrollton, Ohio

[21] Appl. No.: 230,898

[22] Filed: Apr. 21, 1994

Related U.S. Application Data

[63] Continuation-in-part of Ser. No. 134,411, Oct. 8, 1993, abandoned.

[51] Int. Cl.$^6$ .............................. G01B 5/03; G01B 5/16
[52] U.S. Cl. ...................... 33/501.7; 33/501.14; 33/556
[58] Field of Search .................................. 33/1 M, 501.7, 33/501.14, 501.15, 503, 504, 505, 546, 549, 551, 556, 559, 572, 573, DIG. 15

[56] References Cited

U.S. PATENT DOCUMENTS

| | | |
|---|---|---|
| 3,188,745 | 6/1965 | Gates et al. . |
| 4,207,565 | 6/1980 | Isakson et al. ..................... 33/DIG. 15 |
| 4,213,244 | 7/1980 | Bell et al. . |
| 4,272,892 | 6/1981 | Rose . |
| 4,483,079 | 11/1984 | Band et al. . |
| 4,520,700 | 6/1985 | Herzog et al. . |
| 4,763,420 | 8/1988 | McCabe et al. . |
| 4,790,078 | 12/1988 | Schneider . |
| 4,807,152 | 2/1989 | Lane et al. . |
| 4,848,004 | 7/1989 | Wilkins ................................. 33/1 M |
| 4,924,598 | 5/1990 | Gruhler . |
| 4,928,396 | 5/1990 | Raleigh . |
| 5,042,162 | 8/1991 | Helms . |
| 5,131,161 | 7/1992 | Drag . |
| 5,134,782 | 8/1992 | Breyer et al. . |

FOREIGN PATENT DOCUMENTS 2-150701 A   6/1990   Japan ............................... 33/DIG. 15

OTHER PUBLICATIONS

Klingelnberg product brochure entitled: "Fully Automatic CNC–Controlled Gear Measuring Centers" PNC 130 VA/PNC 200 VA, date unknown.
Hofler brochure entitled: "Five Companies' Experiences With Hofler Gear Inspection Centers", date unknown.
M&M Precision Systems operating manual, Soft Mic.® CMM Retrofit System, copyright 1989.
M&M Precision Systems, M&M Universal CNC Gear Inspection Systems, copyright 1993.

*Primary Examiner*—William A. Cuchlinski, Jr.
*Assistant Examiner*—G. Bradley Bennett
*Attorney, Agent, or Firm*—Watts, Hoffmann, Fisher & Heinke

[57] ABSTRACT

A monitoring system having a stylus mounted to a support that controllably moves the stylus along a travel path as it contacts an object of interest. The object is supported by a rotating turntable and held in place by a manually actuatable retainer that exerts a repeatable downward force on the object. A frame that supports the stylus is supported by a flexure plate that makes the task of orienting the frame easier. The frame supports a saddle that can be raised and lowered by a belt system driven by a D.C. pancake motor. The entire monitoring system achieves a required degree of accuracy in monitoring object shape at a reduced manufacturing cost.

21 Claims, 13 Drawing Sheets

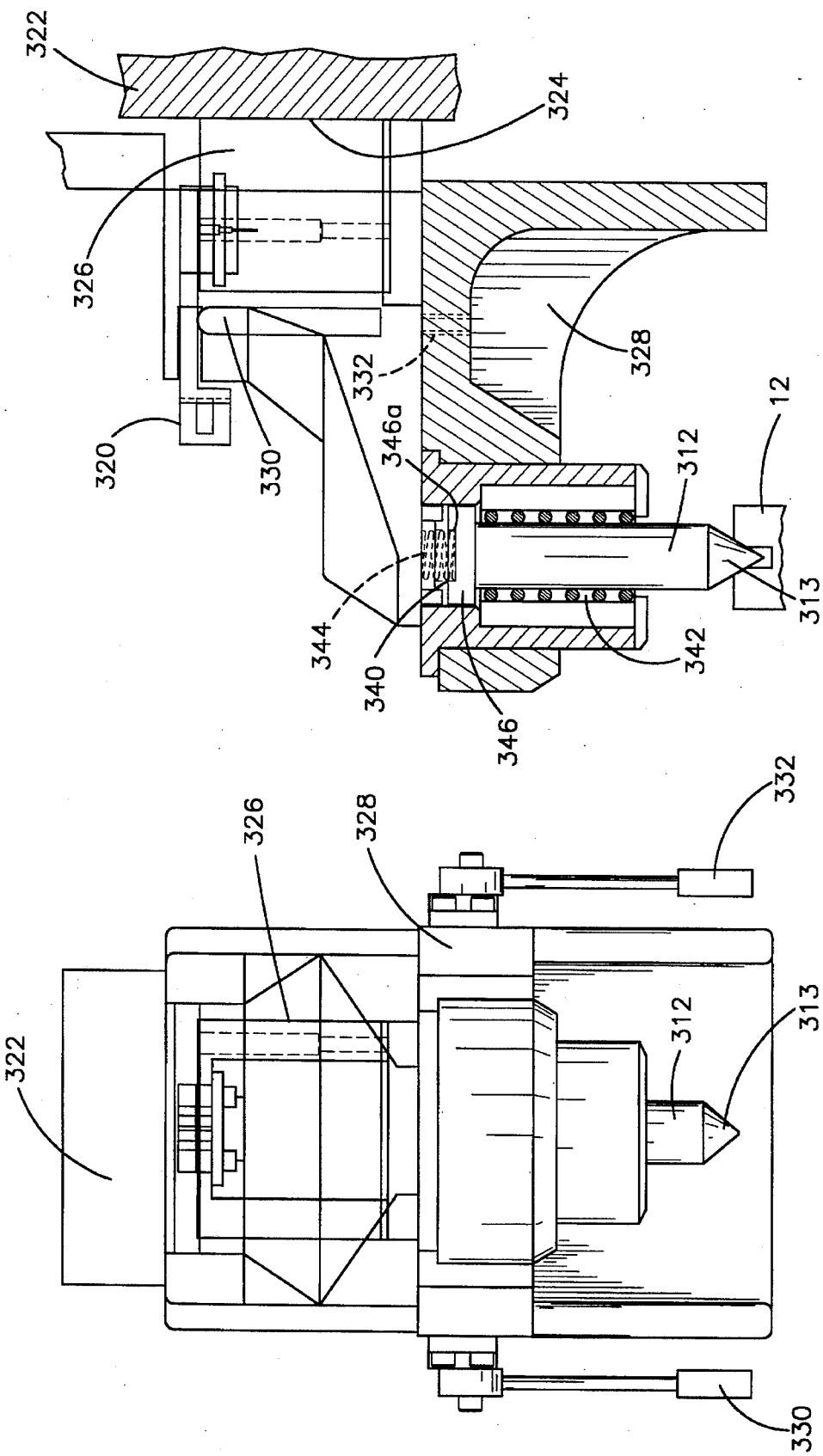

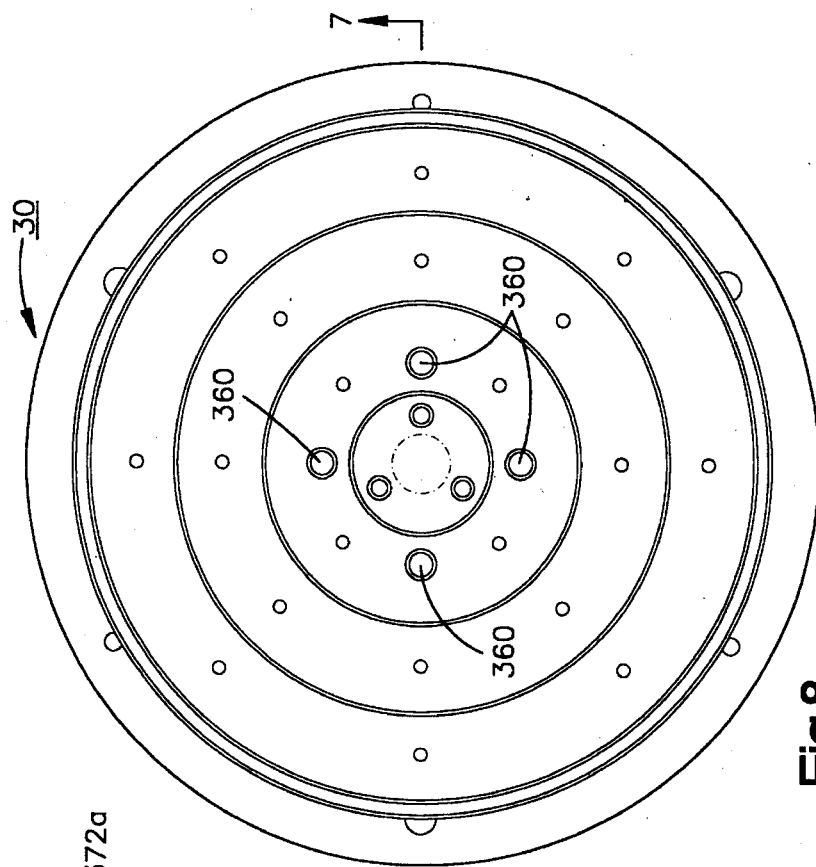
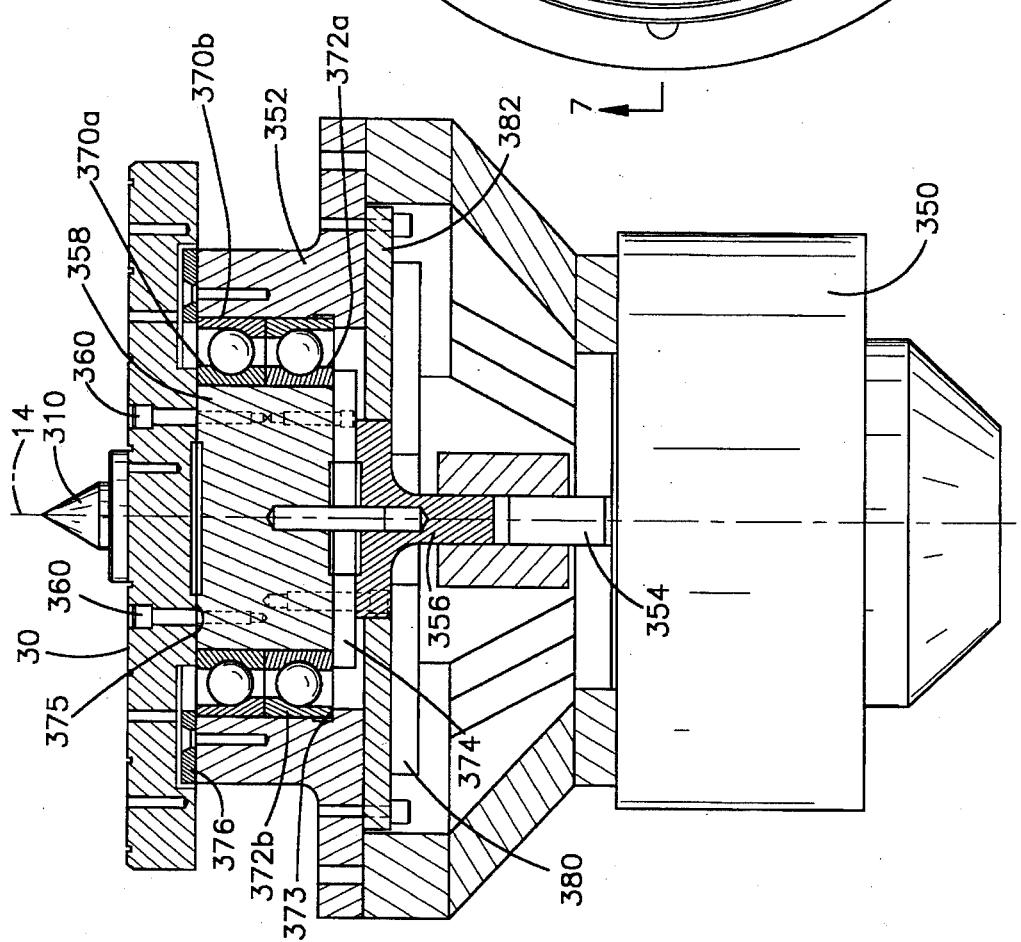
Fig.7
Fig.8

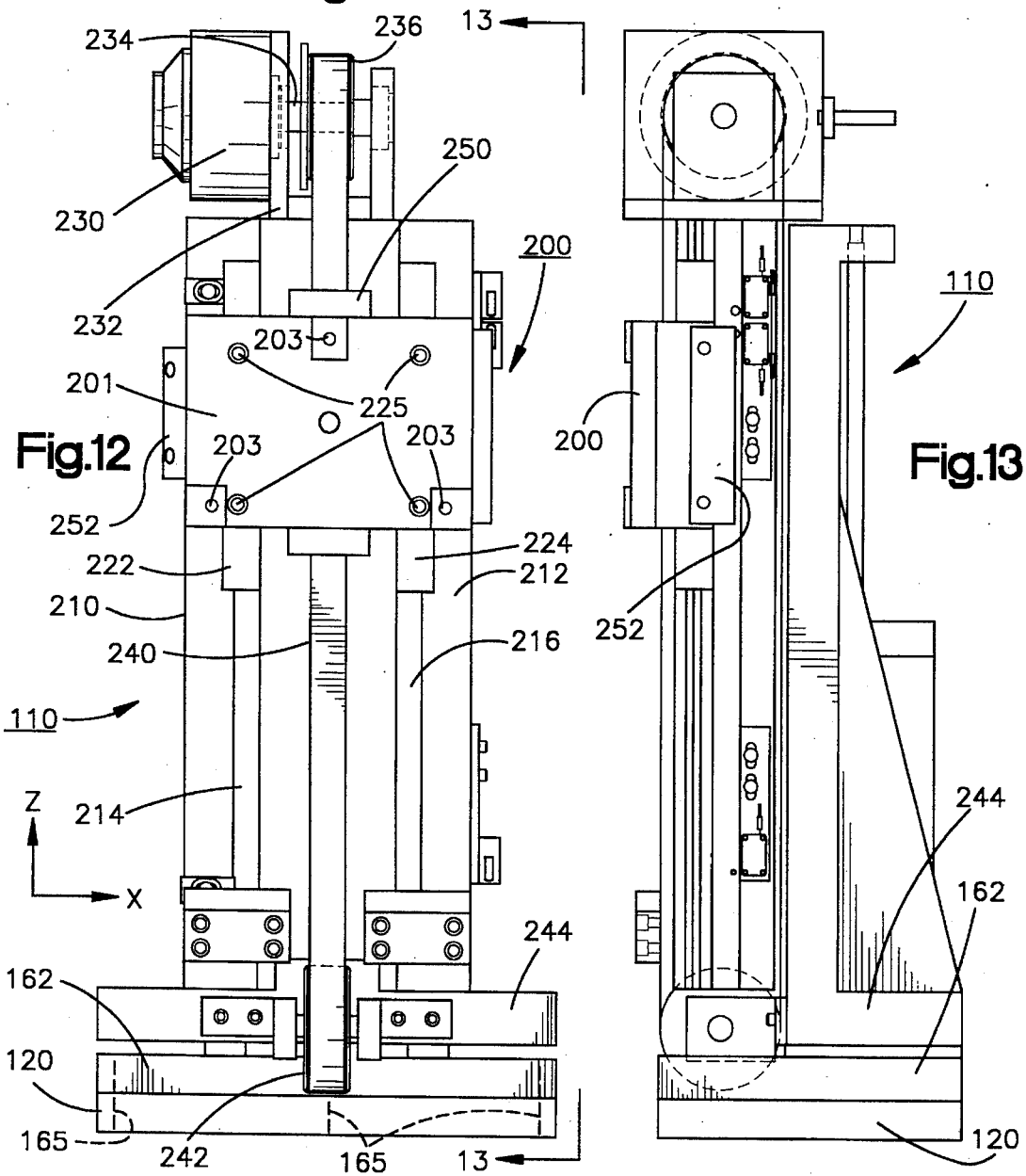

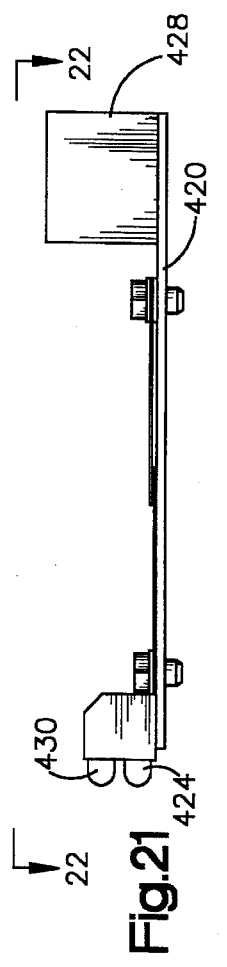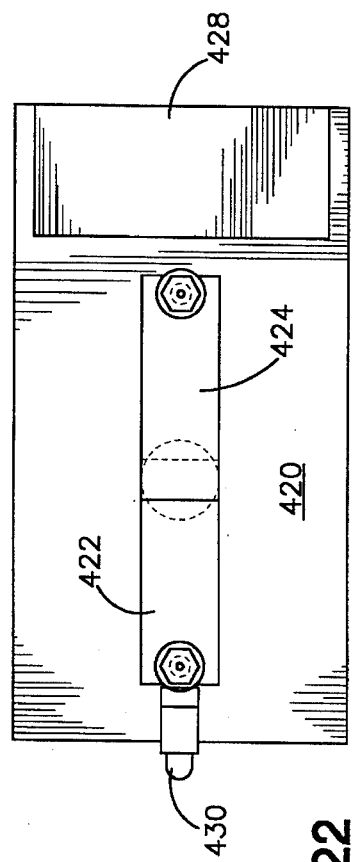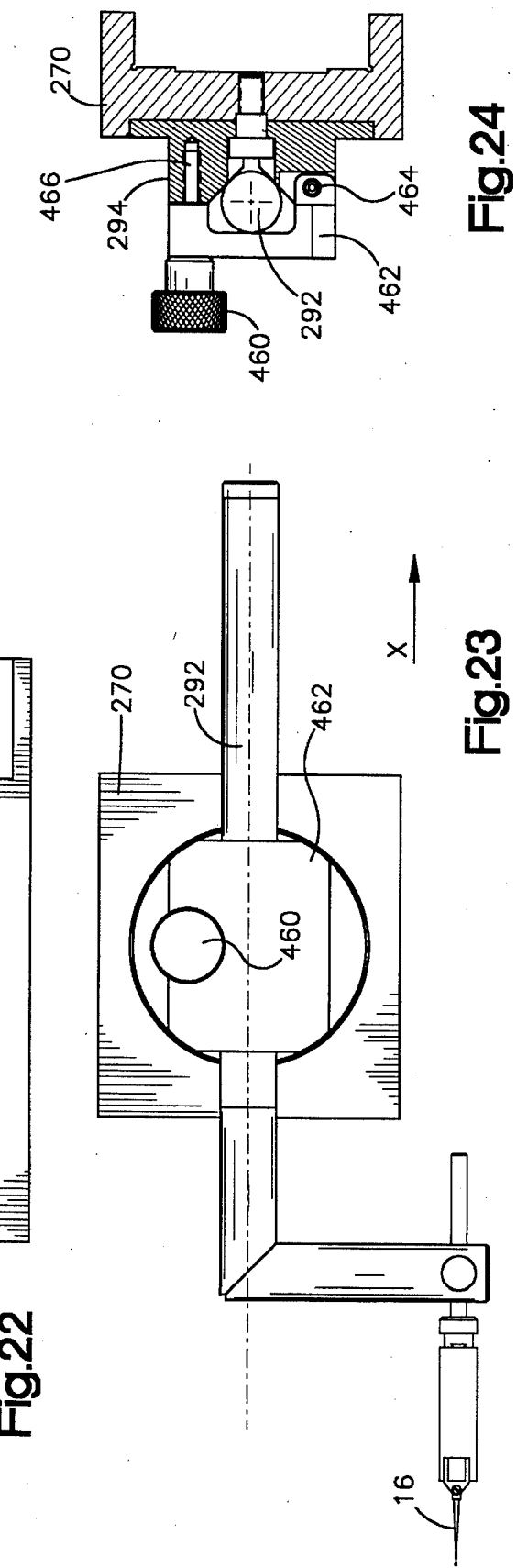

GENERATIVE MEASURING SYSTEM

Cross-Reference to Related Application

The present application is a continuation-in-part of U.S. Ser. No. 08/134,411 to Evans et al. entitled NEW AND IMPROVED GENERATIVE MEASURING SYSTEM, which was filed Oct. 8, 1993, now abandoned.

FIELF OF THE INVENTION

The present invention concerns an automated monitoring system for determining or confirming the shape of a machined item such as a gear.

BACKGROUND ART

The Assignee of the present invention, M&M Precision Systems Corporation, has commercialized prior monitoring systems for determining or confirming the shape of a machined item such as a gear and the like. These prior art monitoring systems are commercially sold under the designation Model Numbers 3012, 3018, 3025, 3040 and 3060 where the last two digits indicate the diameter of the workpieces (in inches) the system is capable of monitoring.

The prior art systems sold by the Assignee of the invention include a moveable frame mounted to a base and including a drive system for moving a stylus or probe along three independent directions by controlled energization of multiple drive motors. As an example, the frame could be moved horizontally in the direction of a first axis by means of a motor that rotates a precision ground ballscrew. As the ballscrew rotates the frame is moved very accurately with respect to an origin.

The carriage supports an arm extending away from the frame having a stylus at one end which comes into contact with the object under examination. The stylus is constructed using an LVDT monitoring probe. Such a probe produces an output signal related to the position of a moveable probe member with respect to the probe body. Through a controlled monitoring of the output signals from the probe, and controlled continuous movement of the frame, including a feedback monitoring of optical encoder signals as the frame moves, the monitoring system can accurately determine the position of the moveable probe tip. This allows the monitoring system to accurately compare any curve on a surface of a machined part with the desired shape of that surface. Alternately the monitoring system can test an unknown surface and store a representation of the part for late use as a standard.

In accordance with the prior art monitoring systems, the object under examination is supported on a turntable and held in place by a clamping member having a live center which is motor actuated. The object under examination is placed on the turntable and the clamp energized to bring the object engaging portion of the damp into engagement with the object. Once the object has been secured to the turntable, controlled energization of a turntable drive causes the object to rotate. Precise control over the turntable rotation is achieved by means of an air bearing which supports the turntable above a turntable support and feedback monitoring of sensed turntable rotation.

The combination of extremely accurate rotation of the object under examination, in conjunction with the use of a ballscrew drive for moving the carriage has added to the cost of making prior art monitoring systems. Accurate movement and position sensing require the frame that supports the probe to be leveled both during manufacture of the monitoring system and as it is installed. This is achieved in the prior art by scraping engagement surfaces of the carriage support during fabrication of the monitoring system. This scraping process is done manually and performed on a trial-and-error basis. A significant amount of time during production of a monitoring system goes into the scraping and leveling of the moveable carriage that supports the probe or stylus.

The prior art systems sold by M&M Precision Systems are expensive to build. It is one object of the present invention to provide an accurate yet economic monitoring system without resort to some of the more expensive components and techniques used in prior art monitoring systems.

Disclosure of the Invention

A monitoring system constructed in accordance with the present invention includes a stylus mounted to a support that can be moved along a controlled travel path as the stylus engages an object. The monitoring system includes a base having a generally level support surface for mounting a frame for movement along a travel path. The frame includes an arm that extends outwardly away from the frame and supports a stylus which can be positioned relative the base by controlled movement of the frame. A track is supported by the base and defines a travel path for the frame and attached stylus. The carriage support includes a flexure plate connected to the base by means of multiple connectors which can be adjusted to level the carriage and orient it in a preferred orientation during setup of the monitoring system.

Use of a flexure plate rather than controlled scraping of engagement surfaces is a significant factor in reducing the cost of producing a monitoring system in accordance with the invention. By an alignment process of adjusting the connectors between the flexure plate and the base, the setup of the monitoring system is simplified both at the factory as the monitoring system is being produced as well as on site where the monitoring system needs periodic adjustment during its operation.

In accordance with a further aspect of the invention, the object support includes a column and an object retainer mounted to the column that moves along a linear travel path. The object retainer is moved with the help of a gas activated drive, thus eliminating the expensive ballscrew drive mechanism used in the prior art. The user places the object onto a turntable and manually adjusts the position of the object retainer to secure the object in place prior to automated monitoring of the object's shape.

The moveable frame supports a so-called saddle which supports the stylus or probe for up and down movement. A linear guide or track supports the saddle for such movement. A belt drive system reeved over a drive pulley and idler pulley engage the saddle for moving the saddle up and down relative the carriage. The drive system preferably incorporates a so-called pancake motor, named for its flat shape and compact configuration. The so-called pancake motor is a DC motor which can be energized by a control system to move the saddle relative the carriage. The belt system replaces the more costly ballscrew used in the prior art. To eliminate damage of the monitoring system if the belt breaks, a duplicate belt not under tension, is also attached to the saddle. If the primary or tensioned belt breaks, the secondary belt will prevent the carriage from falling.

In accordance with a further aspect of the invention, the expensive air bearing system of the object turntable has been replaced with a precision ground bearing for supporting the turntable. A second pancake motor coupled to the turntable rotates the object as the stylus or contact probe comes into contact with the object.

It is one object of the invention to provide a monitoring system at a reasonable cost while maintaining a required degree of accuracy. This and other objects, advantages, and features of the invention will be become better understood from review of a detailed description of a preferred embodiment of the invention which is described below in conjunction with the accompanying drawings.

BRIEF DESCRIPTION OF THE DRAWINGS

FIG. 4 is an elevation view of the object holder for securing an object on the rotating pedestal;

FIG. 5 is a partially sectioned view of the object holder for locking an object in place;

FIG. 7 is a section view of a motor and bearing supporting a precision spindle for controllably rotating an object secured to the spindle by the object holder;

FIG. 8 is a plan view of the object spindle;

FIG. 11 is a plan view of a frame that is mounted to the base shown in FIG. 9 for linear translation along a travel path to provide one direction of movement for the stylus;

FIG. 12 is a view of the frame as seen from the plane 12—12 in FIG. 11;

FIG. 13 is a view of the frame as seen form the plane 13—13 in FIG. 12;

FIG. 21 is an elevation view of a circuit board supporting a battery for energizing light-emitting diodes for signaling the position of the retainer;

FIG. 21A is an enlarged view showing an actuator for energizing the light-emitting diodes;

FIG. 22 is an elevation view as seen from the plane 22—22 of FIG. 21;

FIG. 23 is an enlarged elevation view of a probe support; and

FIG. 24 is a partially sectioned of the FIG. 23 probe support.

BEST MODE FOR PRACTICING THE INVENTION

Figure 1:
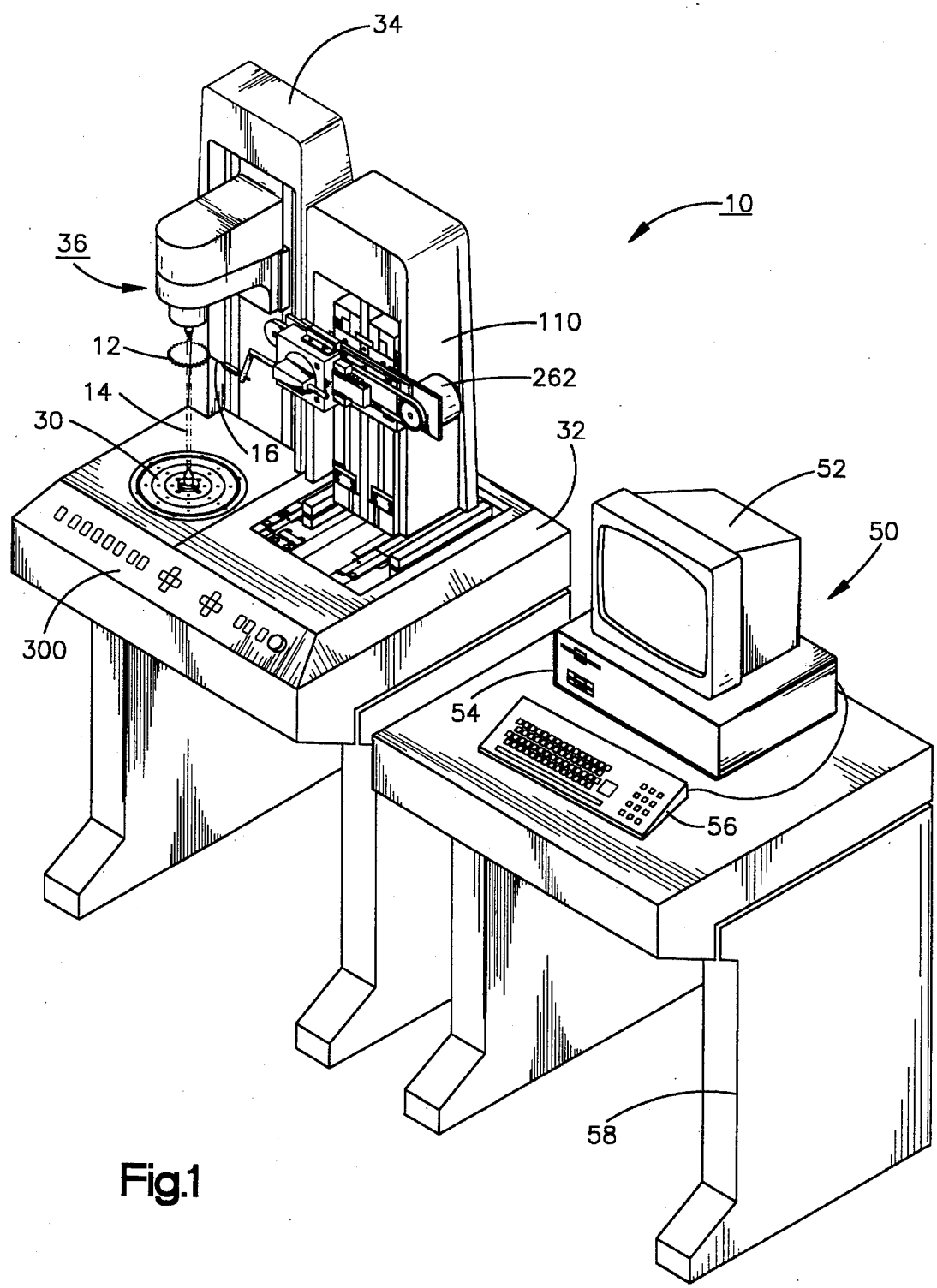
FIG. 1 is a perspective view of a monitoring system constructed in accordance with the present invention.

FIG. 1 is a perspective view of a monitoring system 10 for evaluating a workpiece 12 such as a machined product manufactured to certain specifications. The particular workpiece 12 depicted in the drawings is a gear have a tooth pattern that is to be checked by the monitoring system 10. One use of the monitoring system is to perform a periodic check of the workpieces that are being produced and determine if the workpiece fails within customer specifications.

An alternate use of the monitoring system is for checking the shape of an unknown curve and defining that curve with a series of co-ordinate locations. Either of these applications typically requires that the workpiece be rotated about a center axis 14 as a probe or stylus 16 contacts a surface of the workpiece. The particular gear shown in the drawings requires that the probe 16 contact an outer surface but the probe can be configured to also monitor the shape of an interior curve of a annular object.

Figure 2:
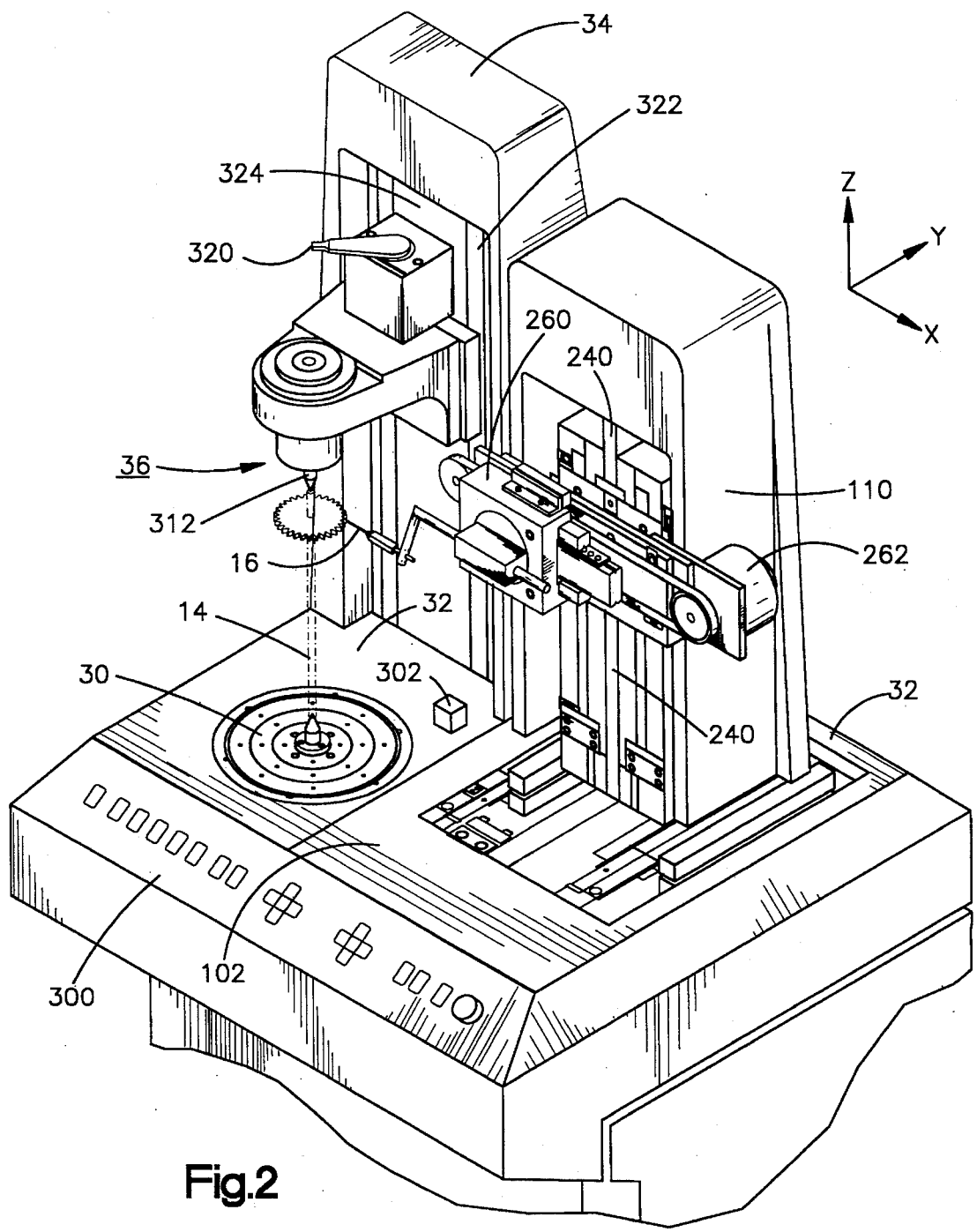
FIG. 2 is an enlarged perspective view of the FIG. 1 monitoring system showing an object holder for securing an object in place on a rotating turntable in spaced relation to a moveable stylus.

The gear shown in FIGS. 1 and 2 is mounted to a rotating circular table 30 supported on a base 32. Extending upward away from the base 32 is a column 34 that supports an object retainer 36. Prior to monitoring the shape of an object, the object must be positioned in contact with the table and fixed in place by the moving the retainer up and down with respect to the column 34. While in the prior an the step of fixing the workpiece to the table was automated by a motor and a ballscrew the disclosed monitoring system 10 employs a manually operated object retainer 36.

Once the workpiece has been fixed to the table 30 the stylus 16 is brought into engagement with a surface of the workpiece and the table is rotated as the stylus moves in and out to follow the contour of the workpiece. In a use where the monitoring system monitors a shape and compare that shape with a known standard the stylus is made to follow a controlled path and deviations between the sensed shape of the object and the controlled path are plotted.

The monitoring system includes an operator console 50 which allows an operator or user to view the monitoring process on a viewing screen 52. The viewing screen is updated by a computer 54 that responds to user inputs entered at a keyboard 56 and responds to those inputs to display data and perform calculations. The computer rests on a base 58 spaced to the side of base 32 supporting the moving stylus 16.

In accordance with a preferred embodiment of the invention the monitoring system 10 includes a second programmable controller (not shown) to control movement of the stylus 16. The second programmable controller has an interface that is electrically coupled to sensors and servo drives that monitor and control movement of the stylus 16. The second controller also communicates with the computer 54 via a serial interface.

Figure 10:
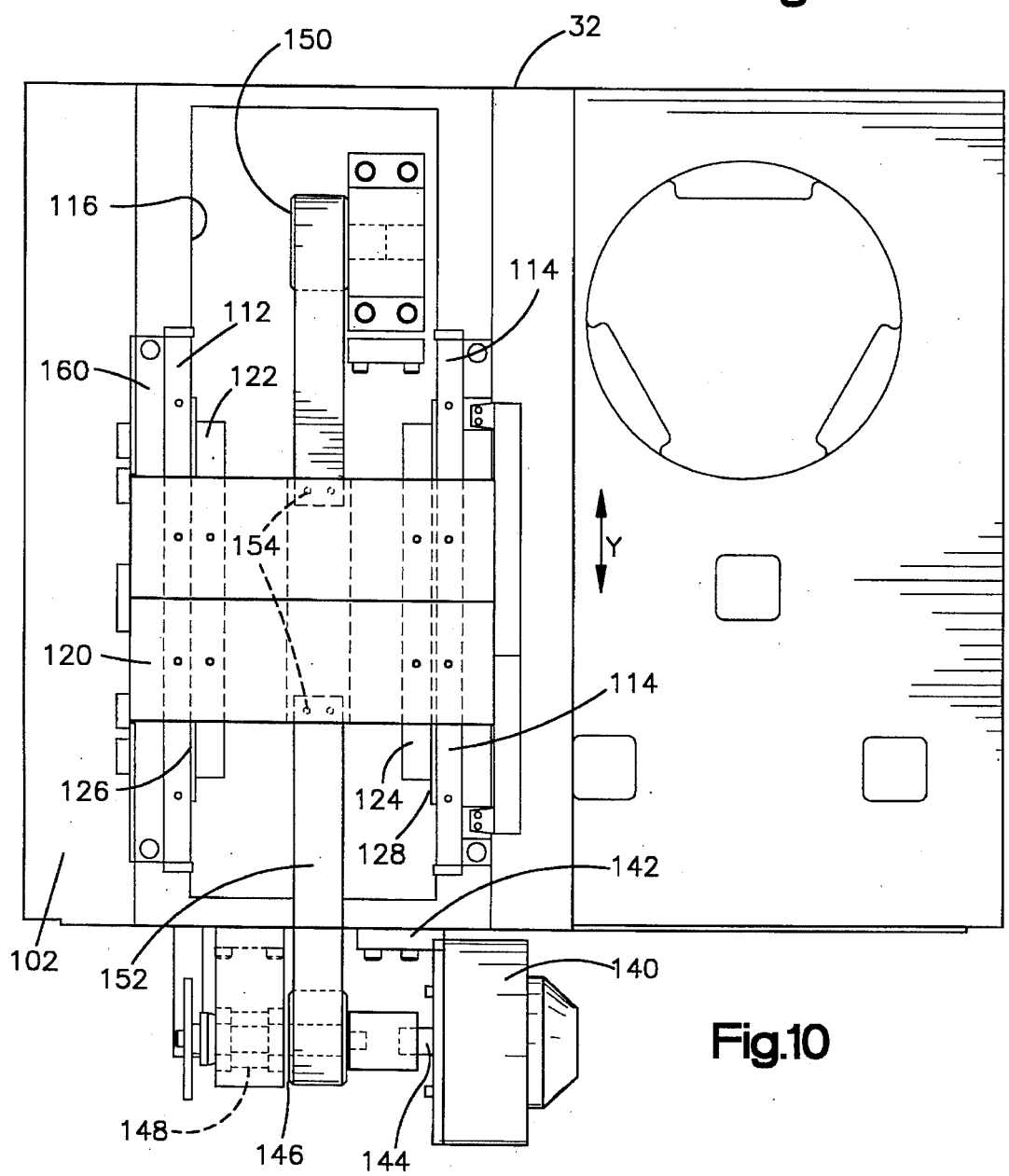
FIG. 10 is a view from the plane 10—10 defined in FIG. 9.

The base 32 positioned beside the console 50 supports structure for moving the stylus along a controlled travel path. The base 32 defines a generally flat, level surface 102 (FIG. 2) that supports a moveable frame 110. A frame guide includes two spaced apart fixed rails 112, 114 (FIG. 10) attached on opposite sides of a opening 116 in the base 32.

The rails 112, 114 constrain the frame 110 to a linear travel path that defines a Y-direction in an orthogonal co-ordinate system. Since the frame 110 moves back and forth in the Y-direction, the frame is sometimes referred to as the Y-saddle.

The frame 110 includes a frame base 120 (FIGS. 10,12) which is a flat metal plate positioned within the opening in the base 32. Two rails 122, 124 extend down from a bottom surface of the base 120 between the rails 112, 114 that are attached to the base 32. The two rails 112, 122 face each other and are connected to a retainer 126 that traps ball bearings between two retainer strips having a ball channel machined along their length. A second retainer 128 is connected to the rails 114, 124 and has two retainer strips having a ball channel. Ball bearings within the two retainers 126, 128 rotate as the frame 110 moves relative to the base 32.

A motor 140 is connected to the base 32 by means of a motor mount 142. This motor is a so-called pancake motor due to its physical appearance. It is a D.C. servo motor commercially available from Infranor Inc. of Naugatuck Conn. under part numbers MT80, MT300 and MT4500. The motor has an output shaft 144 that rotates in response to controlled actuation of the motor by a monitoring system controller. The shaft 144 rotates a drive pulley 146 supported by a support bearing 148. Reeved over the pulley 146 and an idle pulley 150 supported on an opposite side of the base 32 is a drive belt 152.

The belt 152 is pinned to an underside of the frame base 120 by connectors 154 that pass through the belt 152 so that controlled rotation of the output shaft from the motor 140 results in linear movement of the frame 110. In accordance with a preferred embodiment of the invention the belt 152 is constructed from a strong yet lightweight steel having a thickness of 0.005 inches.

As the motor moves the frame 110 relative to the base 32 along the "y" axis, this movement is monitored by an optical encoder 160 (FIG. 10) that monitors movement of the frame 110. The encoder includes an optical sensor mounted to the base 32 and the frame 110 supports a linear scale that moves back and forth relative the optical sensor. While the motor shaft can be very accurately actuated to move the frame, the position of the frame in the "y" direction is determined based upon outputs from the encoder 160.

Orienting the Frame

The orthogonality of all axes of movement of the frame 110 with respect to each other is critical to the performance of the monitoring system 10. Rather than use the scraping process of the prior art, the disclosed monitoring system uses flexure plates to adjust the orthogonality. Interposed between the frame base 120 and the frame 110 is a ¾inch thick steel flexure plate 162 (FIG. 12) that is attached to the base 120 by means of threaded connectors 164a, 164b, 164c spaced in a triangular pattern that extend down through the plate 162 and into threaded openings 165 in the base 120.

The connectors are preferably socket bolts seated within circular sockets in the plate 162. Two connectors 164a, 164b are spaced to form a line that intersects the 'y' axis at a right angle. The third connector 164c is spaced along the 'y' direction from the other two connectors 164a, 164b and located midway between these two in an "x" direction.

After the frame base 120 is attached to the monitoring system base 32, the flexure plate is connected to the frame 110 and then the flexure plate 162 is attached to the moveable frame base 120. As the plate 162 is being attached the orientation of the frame 110 relative to the base 32 is adjusted by tightening or loosening the connectors 164. By adjusting the connectors the orthogonality of the frame 110 with respect to the base 32 is adjusted.

The frame 110 supports a "z" saddle 200 (FIG. 13) for up and down movement with respect to the base 32. Vertically oriented frame supports 210, 212 extend upward from the flexure plate 162 and define a linear travel path for the saddle 200. Rails 214, 216 attached to the supports 210, 212 carry a ball bearing retainer 220 that is also connected to rails 222, 224 coupled to the saddle 200 by connectors 225 that extend through the saddle 200. As the saddle 200 moves up and down with respect to the supports 210, 212, ball bearings trapped within the retainer 220 rotate and allow the relative translation between the frame 110 and the saddle 200.

A second pancake motor 230 is attached to the frame 110 by means of a bracket 232. An output shaft 234 of the motor rotates a drive pulley 236. A two layer z-axis drive belt 240 is reeved over the drive pulley 236 and an idle pulley 242 attached a base 244 of the frame 110.

Z-axis belt drive

The saddle 200 supports a bracket 250 connected to the saddle and the double layer belt 240. Connectors pass through a hole in both layers of the double layer belt 240 into the bracket 250 to secure the saddle 200 to the belt 240. Controlled energization of the motor 230 raises and lowers the saddle 200 by applying movement to the belt 240. A primary belt is under tension. In the event this primary belt breaks, a secondary belt that overlies the primary belt will prevent the saddle from falling and possibly damaging the monitoring system. Both belt layers are constructed from a thin steel layer 0.005 inches thick.

Use of a double layer drive belt 240 is less expensive to manufacture than the ballscrew drive of the assignee's prior art systems. This and use of the pancake motor 230 provides controlled precise movement of the saddle 200 and at a significantly lower cost.

Up and down movement of the "z" saddle 200 is monitored by a linear encoder 252 that senses motion and positioning of the saddle 200. The encoder sends back signals corresponding to movement of the saddle 200 that are used by the programmable controller to determine the position of the stylus 16 relative to a reference position.

Figure 14:
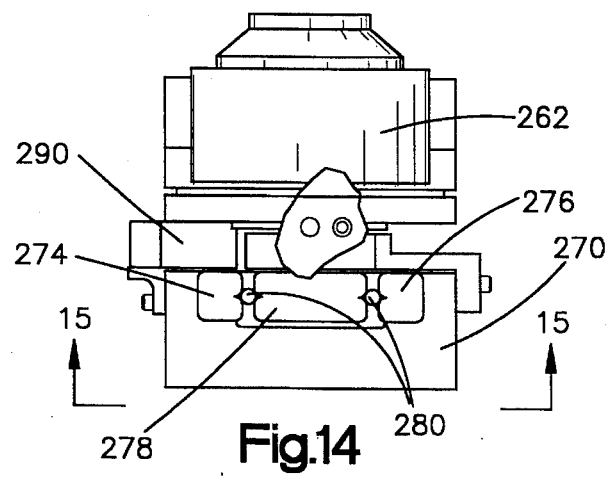
FIG. 14 is a side elevation view of a saddle mounted to the carriage depicted in FIGS. 11–13.
Figure 15:
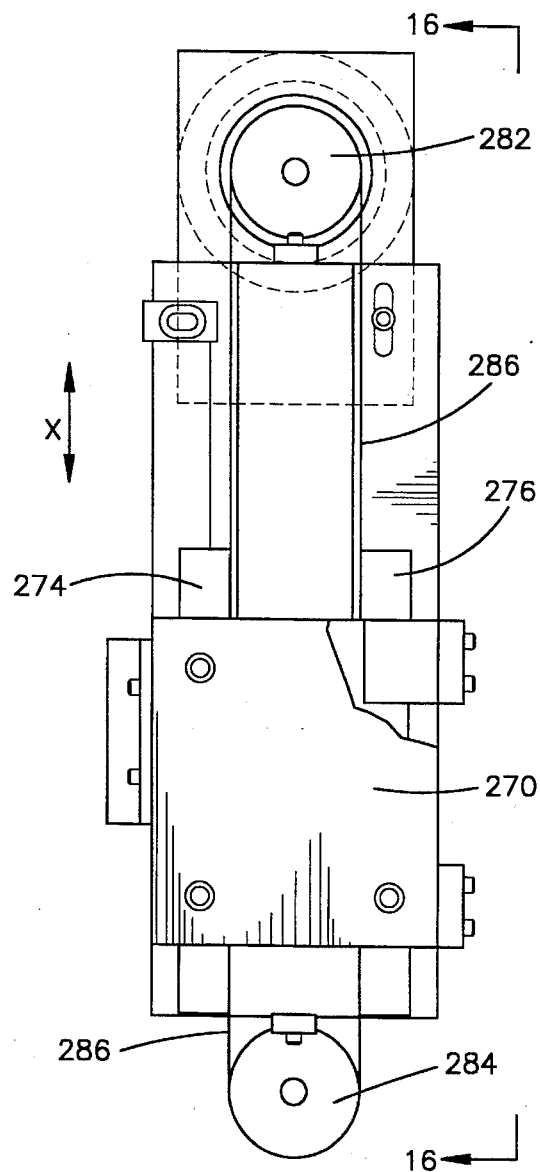
FIG. 15 is a view as seen form the plane 15—15 in FIG. 14.
Figure 16:
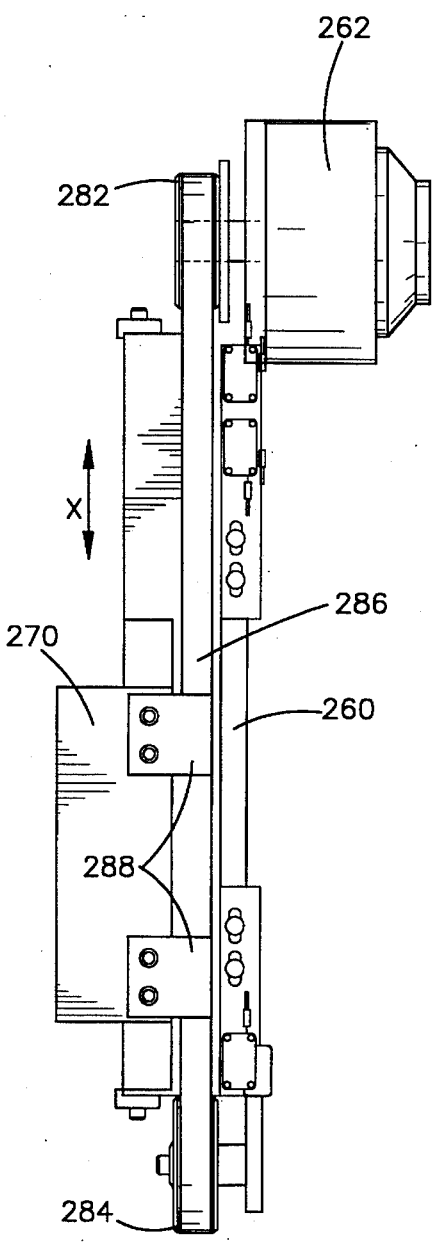
FIG. 16 is a view as seen form the plane 16—16 in FIG. 15.
Figure 17:
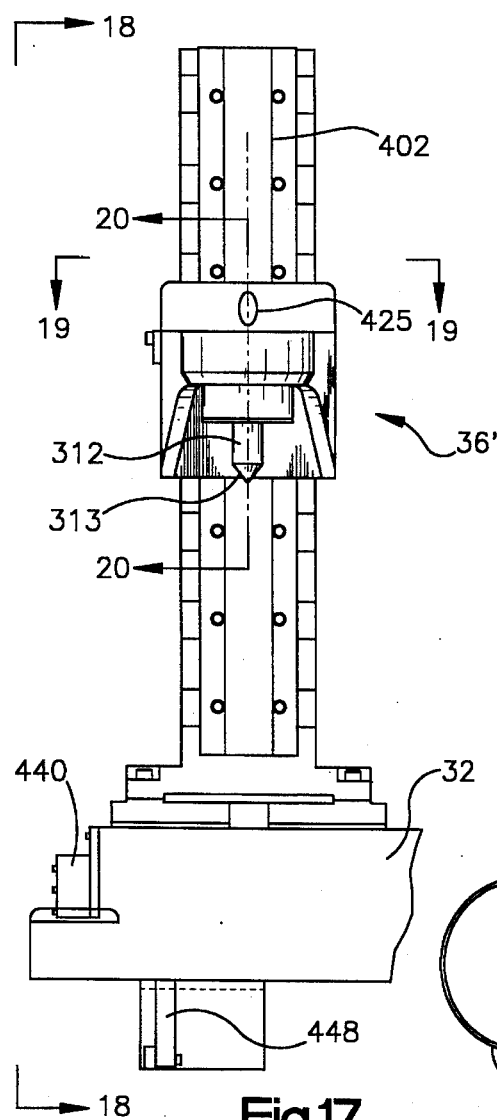
FIG. 17 is an elevation view of an alternate and presently preferred object holder for securing an object on a turntable.
Figure 18:
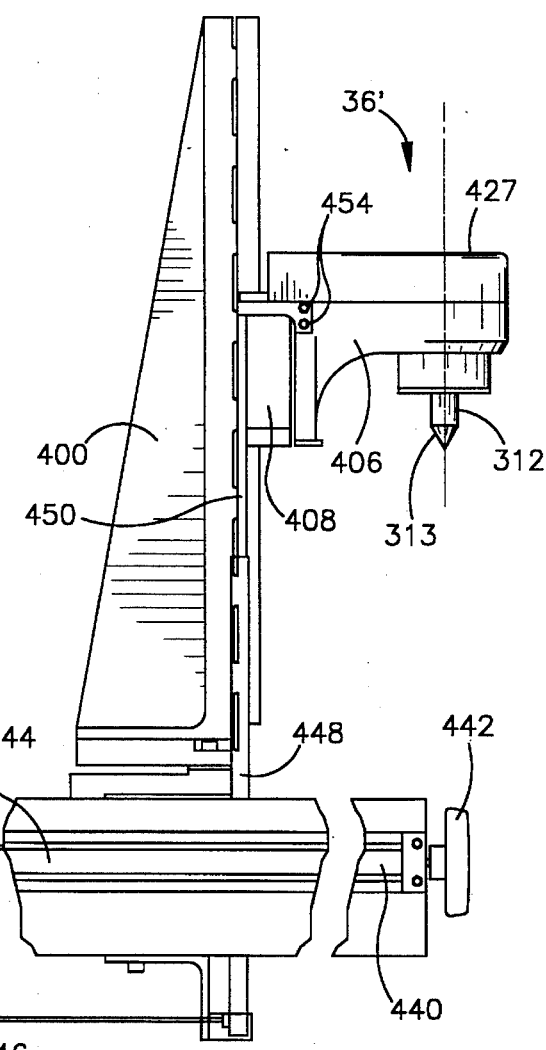
FIG. 18 is a side elevation view of the alternate object holder of FIG. 17 as seen from the plane defined by the line 18—18.

Mounted to the z-saddle 200 is a probe support base 260 (FIGS. 14–16). This base supports a saddle 270 for side to side movement in the "x" direction in response to controlled energization of a motor 262.

The "z" saddle 200 has an outer surface 201 (FIG. 12) that is generally parallel to the x-y plane as that plane is defined in the drawings. The surface 201 supports the base 260 by means of connectors that are threaded into openings 203 in the surface 201. The x-saddle 270 is mounted for back and forth movement in the x direction by means of a track that includes rails 274, 276 fixed to the saddle and a rail 278 coupled to the probe support 260. These rails support a retainer having ball bearings 280 that rotate as the rails move relative to each other in response to actuation of the motor 262.

Attached to the base 260 by means of suitable bearings are drive and idle pulleys 282,284 that support a drive belt 286 attached to the saddle 270 by connectors which connect the belt to two brackets 288. A linear encoder 290 monitors the x-direction movement of the saddle 270 thereby allowing the monitoring system controller to determine the x coordinate position of the stylus 16.

Figure 3:
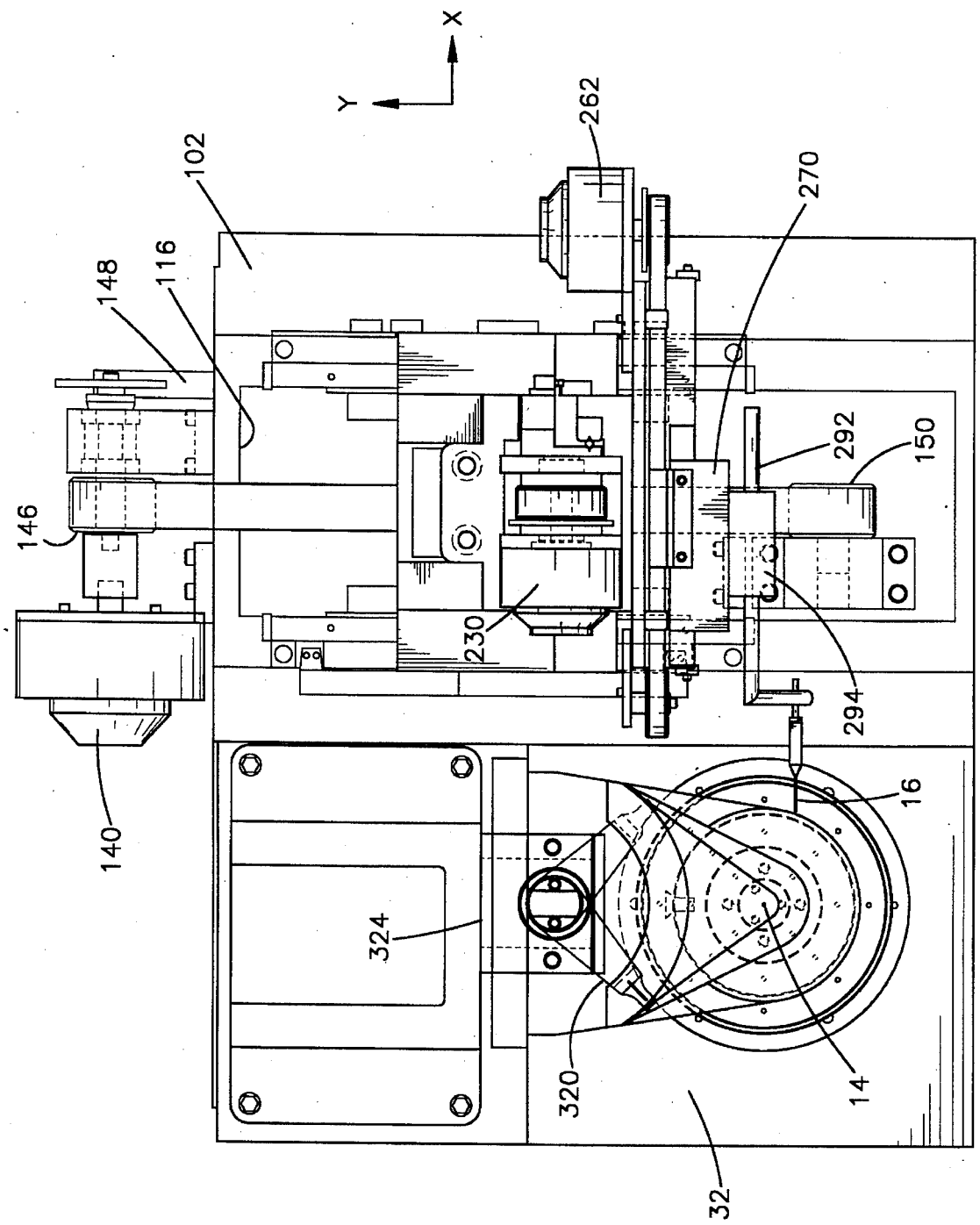
FIG. 3 is a plan view of a stylus support for moving the stylus into engagement with an object held in place on the rotating turntable.

A probe arm 292 (FIG. 3) is mounted to a probe mounting block 294 coupled to the saddle 270. The orientation of the probe arm 292 can be adjusted depending on the object under examination by the monitoring system. Such probe arms are known in the prior art and are incorporated, for example, in the assignee's prior art monitoring systems.

During setup of the monitoring system 10 the three motors 140, 230, 262 are manually actuated by an operator by means of a touch panel control 300 on the front of the base 32. The control panel allows the operator to bring the stylus 16 into contact with a reference object 302 whose position on the base 32 is known. By engaging surfaces of the reference object 302 the monitoring system defines a home position. As the probe or stylus moves away from this home position the controller updates the position of the stylus. Thus, as the monitoring system moves the stylus 16 along a controlled path with respect to the home position corresponding to the desired object's shape, the controller knows the x, y, z co-ordinate of the path and can compare deviations from the path that are sensed by the stylus.

Manually operated Object retainer 36

During a typical examination of an object of interest such as a gear or the like, the monitoring system 10 controls the rotation of the object on the rotating turntable 30. The object to be examined is held in place on the turntable 30 by an upwardly extending conical support 310 (FIG. 7) that is coupled to and rotates with the turntable and supports a bottom of the object 12. A center 312 aligned with the axis 14 and having a downwardly extending conical portion 313 engages a top portion of the object. To mount the object on the turntable 30 an operator lifts the retainer 36 out of the way and places the object on the support 310. The retainer 36 is then manually pulled down until the center's conical end 313 contacts the object and the retainer 36 is locked in position by rotating a locking lever 320.

Figure 5B:
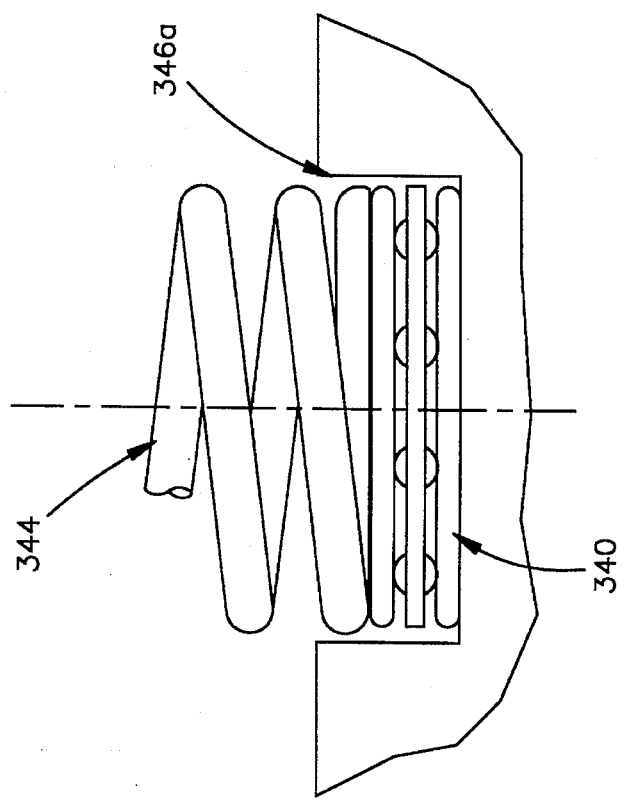
FIG. 5B is an enlarged view showing a top portion of a rotatable center that forms part of the object holder.
Figure 5A:
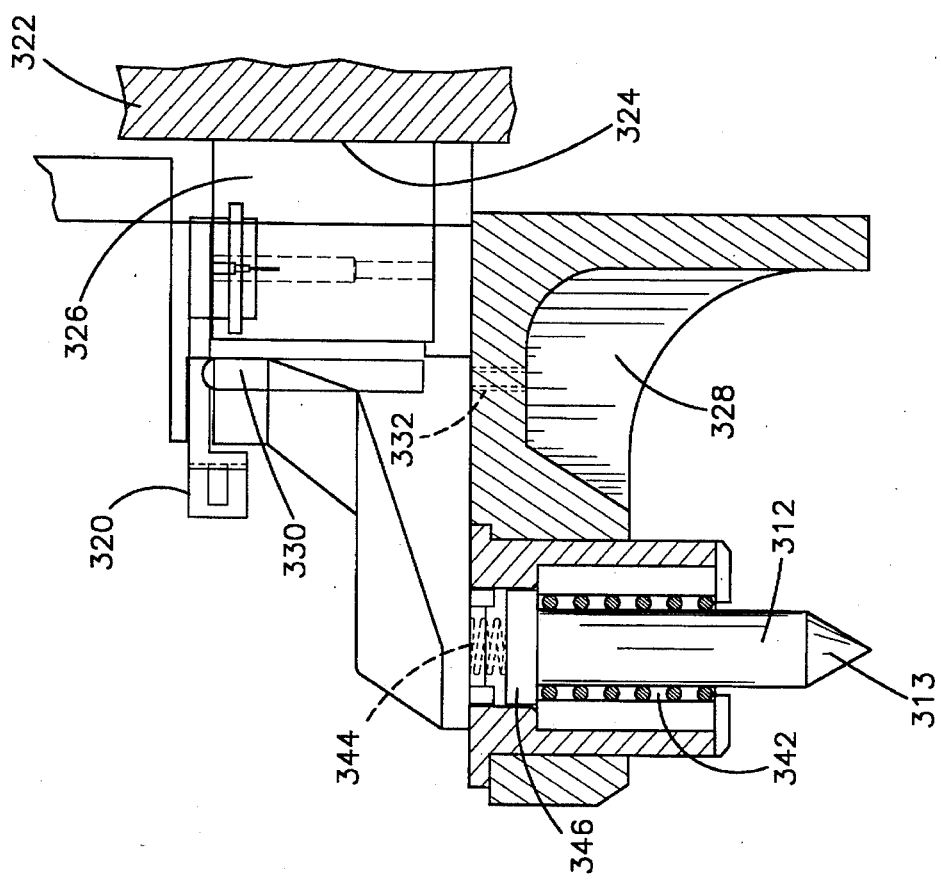
FIG. 5A is a partially sectioned view of the object holder before it locks the object in place.
Figure 6:
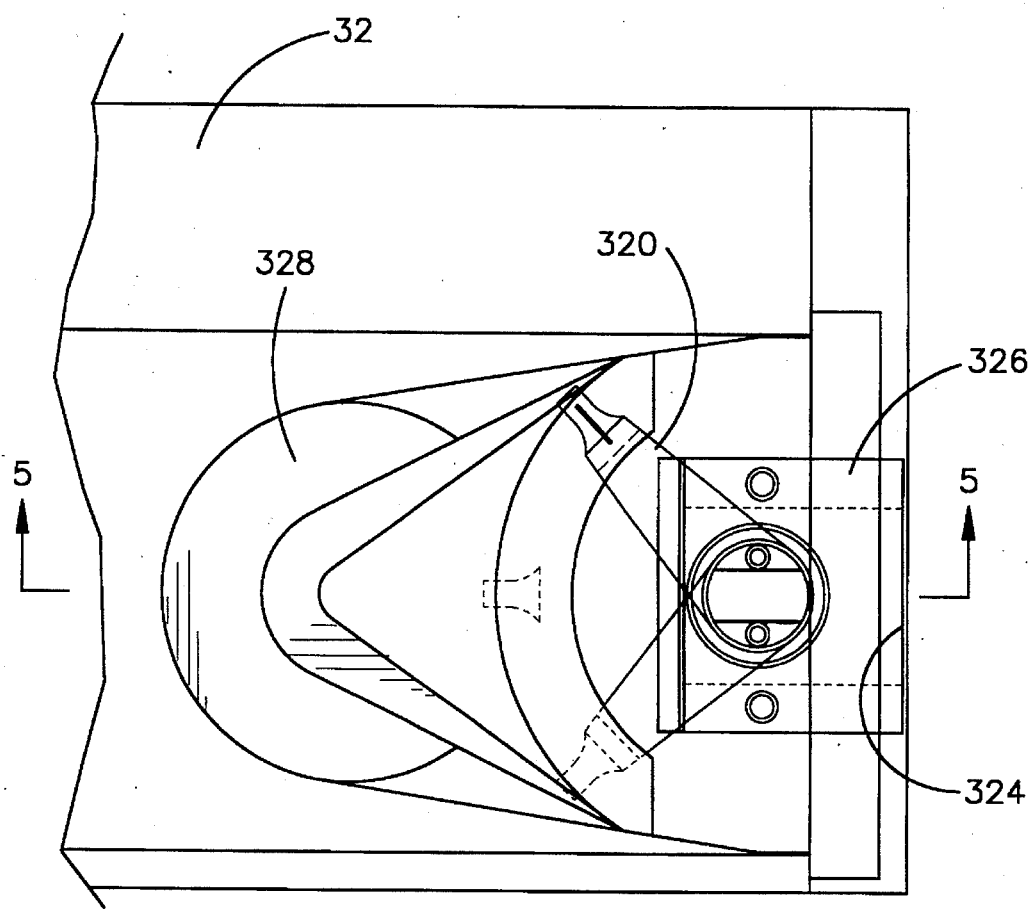
FIG. 6 is a plan view of the object holder of FIGS. 4 and 5.
Figure 9:
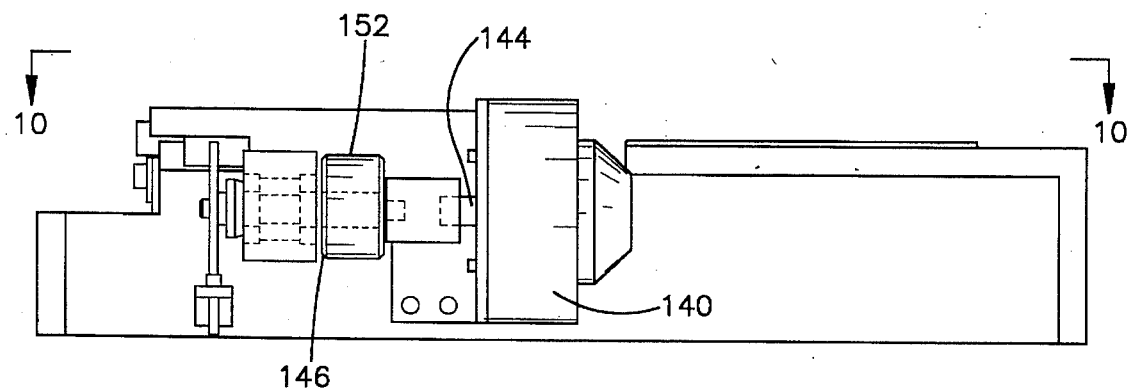
FIG. 9 is an elevation view of a base that supports a moveable frame to which the stylus or probe is attached.

Details of the retainer 36 are shown in FIGS. 4–6. The retainer is constrained for up and down movement with respect to the upright 34. The upright 34 includes a post 322 having a ferromagnetic surface 324 along its length. The surface 324 is spaced from a magnetic base 326 that is supported above a retainer base 328 connected to the post 322 by means of a linear bearing commercially available from THK corporation of Japan.

With the lever 320 in an unlocked position (clockwise as seen from above in FIG. 6) the base 328 can be raised and lowered to position the retainer. The base 328 is partially supported by two air cylinders 330, 332 that ease the raising and lowering of the retainer 36.

When the lever 320 is locked the retainer 36 is fixed in its "z" position. The magnetic base includes a magnet within a housing. When the lever 320 is rotated from its unlocked to locked position in a counterclockwise sense, the magnet rotates within the base housing and a magnet pole moves toward the column surface 324 to increase the magnetic attraction between the magnet and the ferromagnetic surface 324. This locks the retainer 36 in its "z" position. A preferred magnetic base is commercially available from Traverse Tool Inc.

With the lever 320 in its unlocked position (See FIG. 5A) the center 312 is locked and does not rotate. When the lever locks the retainer in the z position, it also frees the center 312 to rotate with respect to the base 328 and applies a repeatable downward force on the retainer 312 to apply a securing force onto the object to be examined thereby eliminating operator induced errors.

Near an end of the counterclockwise travel of the lever 320 the lever contacts a curved head of a pin 330 threaded along a length of its opposite end. The pin threads into an opening 332 in the base 328 and as the lever 320 is rotated to the locked position (shown in FIG. 5) the pin 330 is forced downward and this downward force is transmitted to the base 328. The base 328 moves downward with respect to the magnet base 326 and loads a thrust bearing 340 (FIG. 5B) supported by the base. A preferred thrust bearing is commercially available from Winfred M. Berg Inc. of East Rockaway, N.Y. When the thrust bearing 340 is loaded the center 312 rotates in a bearing 342 so that the object 12 trapped between the center 312 and the conical support 310 on the turntable 30 can be rotated.

A spring 344 contacts a enlarged head 346 at the top of the center 312. This spring 344 is trapped against the thrust bearing 340 within a circular depression 346a in the head 346 and exerts a repeatable downward force against the center 312 (and hence the object) as the lever fixes the retainer to the support 34.

An alternate and presently preferred manually operated object retainer 36' is depicted in FIGS. 17–22. This retainer 36' is fixed to an upright 400 along an elongated track 402 that extends vertically along the upright. As in the earlier described embodiment, the retainer 36' supports a center 312 aligned with an axis of rotation of the turntable 30 having a downwardly extending conical portion 313 that engages the top portion of the object under examination. To mount the object onto the turntable, an operator moves the retainer 36' upward and places an object such as a gear on the support 310. The retainer 36' is then moved down until the center's conical end 313 contacts the object and an indicator light signals the user the object is fixed in place.

Figure 20:
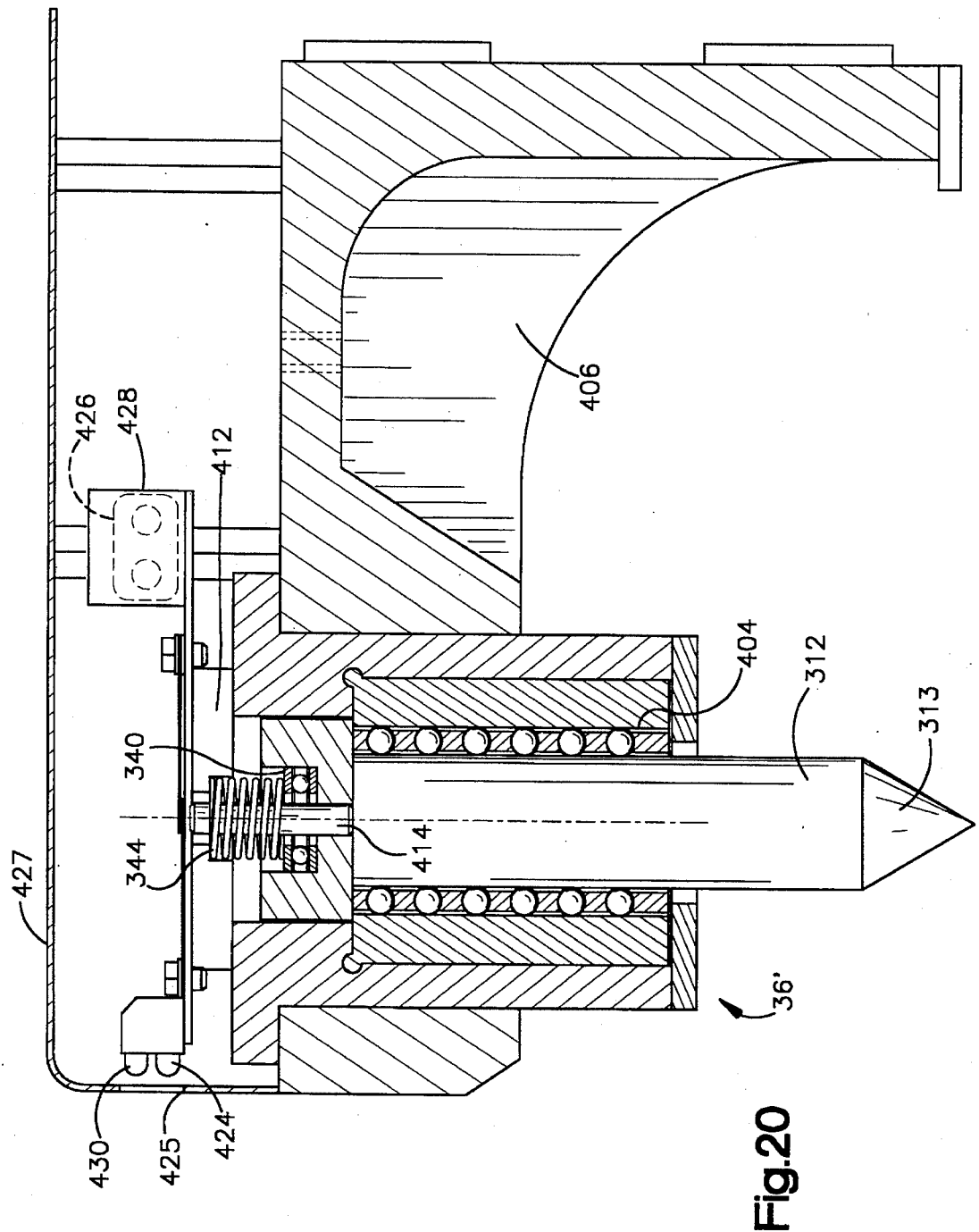
FIG. 20 is a section view as seen from the plane defined by the line 20—20 of FIG. 17.

As seen most clearly in the section view of FIG. 20, the center 312 is mounted for rotation within a bearing 404 supported by a retainer base 406. The base 406 is attached to a bearing housing 408 (FIG. 18) that encloses a recirculating bearing that allows the housing to move smoothly up and down the track 402. A preferred combination bearing and track is commercially available from THK under Part No. HRW 50CA.

As the conical end 313 contacts the object under examination, further downward movement of the retainer 36' applies an upward force against the center 312. A thrust bearing 340 (FIG. 20) such as the thrust bearing shown in FIG. 5B above, is loaded by a force of the compression spring 344 trapped against one surface of the thrust bearing and contained by a collar 412 attached to the base 410. Upward movement of the center 312 loads the thrust bearing and allows the center 312 to rotate.

A pin 414 attached to the center 312 extends upwardly above the center through the spring 344. As the center loads the bearing 340, the pin 414 moves upward and engages a bottom surface of a conductor 422 that is supported by a printed circuit board 420 attached to the collar 412. The pin 414 and center 312 are grounded through the base 406. When the pin 414 engages the conductor 422, a circuit is completed through an LED 424 and battery 426 supported within a battery housing 428. An output from the LED 424 is visible through slot 425 in a cover 427 that overlies the circuit board 420.

Further movement of the pin 414 flexes the conductor 422 and causes it to contact a second conductor 428 to light a second light-emitting diode 430 mounted to the retainer 36'. The light-emitting diode 424 is green and indicates to the user that a specified load has been applied to the object under examination, and examination can begin. If the user inadvertently causes the center to exert too strong a downward force against the object, the second light-emitting diode 430 will be illuminated indicating the user should back off the position of the retainer 36'. Conductive paths (not shown) on the circuit board 420 connect the two LEDs 424, 430 in parallel with the battery 426 when the conductors 422, 424 touch.

Up and down movement of the retainer 36' is accomplished by means of a height adjustment system 440 which supports the retainer 36' and positions the retainer 36' in response to rotational adjustment of a handle 442 at the front of the apparatus. Clockwise rotation of the handle 442 causes upward movement of the retainer 36'. Counterclockwise rotation of the handle causes the retainer 36' to move downward. As the retainer is lowered by means of counterclockwise rotation of the handle, the center 312 contacts the part under examination and the aforementioned loading of the thrust bearing allows the center to rotate. Further downward movement of the retainer 36' causes the green and red lights to be actuated. In the event the red light is actuated, the user can rotate the handle in a clockwise rotation to lift the retainer 36' so that an appropriate force traps the object under examination between the center and the rotating pedestal.

Figure 19:
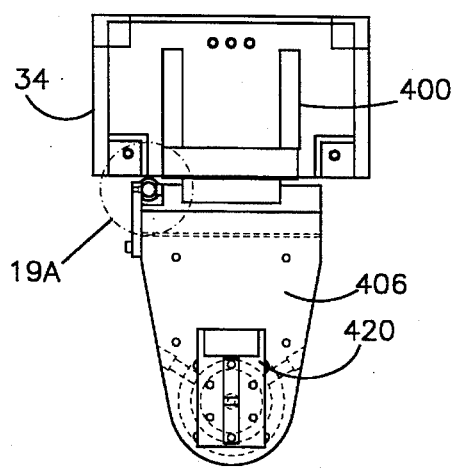
FIG. 19 is a plan view of the FIG. 17 object holder with a panel removed.
Figure 19A:
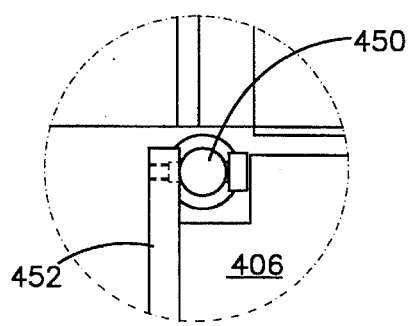
FIG. 19A is an enlarged plan view showing a coupling between the object holder and a pneumatic drive for moving the holder.

The preferred height adjustment system 440 is sold under the designation MOVOTEC® by Suspa Inc. of Grand Rapids, Mich. An elongated body 444 attached to the base 32 supports the handle 442 and directs pressurized fluid through a flexible conduit 446 attached to a vertically oriented elongated tube 448 that supports a moveable piston 450. As seen in the enlarged view of FIG. 19A, one end of the piston 450 is attached to a bracket 452 connected to the retainer base 406 by connectors 454. As the system operator rotates the handle clockwise and counter clockwise, the movement of the piston raises and lowers the retainer 36'.

Rotatable Turntable 30

The object turntable 30 is rotated about the axis 14 by a pancake motor 350 supported by a turntable base 352 fixed to the base 32. (See FIGS. 7 and 8) The motor 350 has an output shaft 354 connected by a transmission 356 to a rotating hub 358 that is attached to the turntable 30 by means of threaded connectors 360.

The hub 358 and turntable 30 are supported by a matched set of angular contact bearings 370,372 commercially available from Barden under part number 115HDL having a advertised maximum radial runout of 0.00015 inches. The bearings have inner races 370a,372a and outer races 370b, 372b. The outer race 372b rests against an annular lip 373 in the base 352 and the inner race 372a is supported by an inner race seat 374 connected to the hub. An inner face 375 of the turntable 30 rests against the inner race 370a and an annular plate 376 is coupled to the base 352 and rests against the outer race 370b.

The components that engage the bearings 370,372 and therefore support the turntable 30 are machined to extremely tight tolerances. By carefully machining these components to these tolerances, the radial and axial runout of the turntable is reduced from the bearing manufacture's advertised specifications to less than 0.000020 axial and radial runout. This is approximately an order of magnitude better than the bearing manufacturer's advertized tolerance. An inductosyn feedback device have a rotor 380 and a stator 382 also monitors the rotation of the turntable 30 and in combination with the precise bearing support of the turntable allows the rotation of the object to be precisely controlled by means of the programmable controller.

FIGS. 23 and 24 illustrate the means of attaching the probe arm 292 to the x-saddle 270. The position of the probe arm 292 relative to the x-saddle 270 can be adjusted to bring the probe 16 to a position so that controlled activation of the pancake motors precisely positions the probe 16. Once the probe arm 292 is fixed relative the xyz coordinate system, and the probe 16 is moved into contact with sides of the object 302 so that the controller knows the coordinates of the probe 16 with great precision.

To roughly position the arm relative the x-saddle, the user must free the probe arm 292 for back and forth movement along the x direction. A knurled knob 460 is rotated to loosen the probe arm 292. The probe 292 is supported by a bracket 462 and housing 294. Extending through the bracket 462 is a pin 466 that rotates as the knurled knob 460 is rotated. A clutched fastener is loaded by rotation of the knurled knob 460. As the knob is rotated, the fastener causes the bracket 462 to pivot slightly about a pivot point 464 in a clockwise direction as seen in FIG. 24. This tightens the engagement between the bracket 464, housing 294, and the probe arm 292. Overtightening of the bracket 462 against the probe arm 292 is prevented by the clutched fastener. As the user continues to rotate the knurled knob, the clutch prevents the fastener from overtightening and thereby avoids stresses on the probe arm that affect accuracy of the probe measurements.

The present invention has been described with a degree of particularity. It is the intent that the invention include all modifications and alterations from the disclosed design falling within the spirit or scope of the appended claims.

We claim:

1. A monitoring system having a stylus mounted for movement along a controlled travel path for monitoring an object's shape comprising:

a) a stationary base having a generally level support surface for mounting structure supporting a stylus for movement along a controlled travel path;

b) a moveable frame having an arm that extends away from said frame and supports the stylus to orient the stylus relative to the base;

c) structure supported by the stationary base to define a travel path for the moveable frame relative to the base comprising;

i) a guide attached to the stationary base that defines the travel path for said frame:

ii) a moveable base coupled to the guide for constrained movement along the travel path; and iii) a flexure plate at attached to the frame and connected to the moveable base by means of multiple spaced connectors which can be loosened and tightened to adjust an orientation of the frame relative to the stationary base during set up of the monitoring system; and d) a motor supported by the stationary base and coupled to the frame for moving the frame relative the stationary base along the travel path defined by the guide.

2. The monitoring system of claim 1 which further comprises an object support for securing an object to be examined in spaced relation to the frame, said object support comprising a vertical column including a magnetic portion and a moveable object retaining member supported for up and down movement relative to the column and including a magnet whose position relative to the magnetic portion of the column can be adjusted to fix the object retaining member relative the column.

3. The monitoring system of claim 1 additionally comprising an additional guide attached to the frame for supporting a vertically moveable probe support, a driven pulley coupled to said frame at one end of the additional guide and an idle pulley coupled to the frame at an opposite end of said additional guide, a first belt that engages the driven and idle pulleys and connects to the moveable probe support to move the probe support up and down; and a second motor coupled to the frame for rotating the driven pulley.

4. The monitoring system of claim 2 wherein the object support further comprises a turntable, a motor coupled to the turntable for turning the turntable, and a turntable support comprising a precisely ground bearing set coupled to the motor for rotating the turntable.

5. The monitoring system of claim 2 wherein the frame comprises spaced apart upright columns supporting a probe support by means of a track for guiding the probe support in a direction orthogonal to movement of the frame and further comprising a belt attached to the probe support for moving the probe support along the orthogonal direction.

6. The monitoring system of claim 4 wherein the object support comprises spaced apart object contacting members, one contacting member coupled to the turntable and a second rotatable object contacting member connected to the moveable object retaining member.

7. The monitoring system of claim 6 wherein the moveable object retaining member comprises a base and a bearing set for supporting said second object contacting member relative to the base.

8. The monitoring system of claim 7 wherein the moveable object retaining member further comprises rotation limiting means for limiting rotation of the second object contacting member until the object retaining member is fixed with respect to the column.

9. The monitoring system of claim 3 additionally comprising a second belt that overlies the first belt and holds the probe support in the event the first belt breaks.

10. The monitoring system of claim 1 which further comprises an object support for securing an object to be examined in a position relative the frame, said object support comprising an upright column that supports a movable object retainer and a manually controllable pneumatic actuator that raises and lowers the object retainer along the upright column to secure the object between the object retainer and the object support.

11. A method of monitoring an object's shape comprising the steps of:

mounting an object support for rotation about a vertical rotation axis;

fixing a support column relative to the object support and connecting an object retaining member to the support column for linear up and down movement along a travel path that brings the object retaining member into contact with an object on the object support;

manually moving the object retaining member into engagement with the object to fix the object in place relative to the column and activating a visual indicator corresponding to a downward force of engagement between the object retaining member and the object to indicate to a user when the object is secured for inspection; and rotating the object support while contacting the object with a stylus having a position sensor for monitoring the object's shape.

12. The method of claim 11 wherein the object retaining member is supported by a bearing to allow rotation of the object retaining member about the vertical axis and wherein during the step of moving the object retaining member up and down the object retaining member is prevented from such rotation.

13. The method of claim 12 wherein the column has an exposed ferro-magnetic surface and a retainer base which includes a magnet which is moved toward the ferro-magnetic surface to lock the object retaining member in position while freeing the object retaining member for rotation.

14. The method of claim 11 wherein the stylus is mounted to a moveable frame to bring the stylus into contact with the object during examination of the object's shape and wherein prior to examination of the object a support for the frame is leveled by adjusting connectors that connect a flexure plate to a base and flex the plate to correctly orient the frame prior to examination of the object.

15. The method of claim 14 wherein the frame supports a stylus support for up and down movement with respect to the object and wherein the stylus support is connected to a belt that is wound around pulleys attached to the frame and wherein the step of raising and lowering the stylus support is performed by actuating a motor to raise and lower the belt and attached stylus support.

16. A monitoring system having a stylus mounted to a support that can be moved along a controlled travel path as the stylus contacts an object comprising:

a) a stationary base having a generally level support surface for mounting structure supporting a stylus for movement along a travel path;

b) a moveable frame having an arm that extends away from said frame and supports the stylus to position and orient the stylus relative to the base;

c) track means supported by the stationary base to define a travel path for the frame and attached stylus;

d) a rotating turntable including a motor for rotating the turntable and an object supported by the turntable; and e) structure for securing the object on the turntable as the stylus contacts the object comprising:

i) a rotatable center for contacting the object after the object is placed on the turntable;

ii) a vertical column supporting the rotatable center so that the rotatable center can be raised and lowered relative the turntable to hold the object between the turntable and the rotatable center;

iii) a user-operated actuator having a pneumatically operated cylinder and piston attached to the support for raising and lowering the rotatable center: and iv) a first visible indicator and means for actuating the first visible indicator to indicate when an appropriate force is applied by the rotatable center to an object on the turntable.

17. The monitoring system of claim 16 wherein the user-operated actuator includes a handle that extends and retracts the piston to raise and lower the rotatable center.

18. The monitoring system of claim 16 additionally comprising a second visible indicator and wherein the means for actuating comprises means to actuate the second visible indicator when too great a force is applied to an object on the turntable.

19. The monitoring system of claim 18 where the first and second visible indicators are light-emitting diodes.

20. A monitoring system having a stylus mounted for movement along a controlled travel path for monitoring an object's shape comprising:
   a) a stationary base having a generally level support surface for mounting structure supporting a stylus for movement along a controlled travel path;
   b) a moveable frame that supports the stylus and positions the stylus relative to the base;
   c) structure supporting the moveable frame that orients the frame relative to the base and includes a guide attached to the stationary base to define a travel path for relative movement between the stationary base and said frame; and
   d) a motor supported by the stationary base and coupled to the frame for moving the frame relative the stationary base along the travel path;
   e) said frame comprising:
      i) a pair of vertical supports that extend upward from the stationary base;
      ii) a vertically moveable probe support;
      iii) a driven pulley coupled to said vertical supports at one end;
      iv) an idle pulley coupled at an opposite end of said vertical supports; and
      v) two overlapping belts that engage the driven and idle pulleys and connect to the moveable probe support to move the probe support up and down; and
      vi) a motor for rotating the driven pulley to move the probe support up and down relative to the stationary base.

21. A monitoring system having a stylus mounted for movement along a controlled travel path for monitoring an object's shape comprising:
   a) a stationary base having a generally level support surface for mounting a stylus for movement along a controlled travel path;
   b) a moveable frame comprising:
      i) a pair of vertical supports that extend upward from the stationary base;
      ii) a vertically moveable probe support to which the stylus is attached;
      iii) a driven pulley coupled to said vertical supports at one end;
      iv) an idle pulley coupled at an opposite end of said vertical supports; and
      v) a drive belt that engages the driven and idle pulleys and connect to the moveable probe support to move the probe support up and down; and
      vi) a motor for rotating the driven pulley to move the probe support up and down relative to the stationary base;
   c) structure supporting the moveable frame that orients the frame to the stationary base comprising:
      i) a guide attached to the stationary base to define a linear travel path for relative movement between the stationary base and said frame; and
      ii) a flexure plate connected to the frame by means of connectors which connect the plate to the frame which can be loosened or tightened to orient the frame and up and down movement of the probe support; and
   d) a motor supported by the stationary base and coupled to the frame for moving the frame relative the stationary base along the linear travel path.

* * * * *